United States Patent [19]

Adams

[11] Patent Number: 4,547,844
[45] Date of Patent: Oct. 15, 1985

[54] SHELF HEIGHT SELECTOR

[75] Inventor: Walter P. Adams, Salt Lake City, Utah

[73] Assignee: The Raymond Corporation, Greene, N.Y.

[21] Appl. No.: 349,652

[22] Filed: Feb. 17, 1982

Related U.S. Application Data

[63] Continuation of Ser. No. 20,996, Mar. 16, 1979, abandoned.

[51] Int. Cl.⁴ .............................................. G05R 13/00
[52] U.S. Cl. ..................... 364/189; 318/568; 318/569; 318/601; 318/603; 318/632; 364/424
[58] Field of Search ................ 364/424, 189; 318/561, 318/568, 569, 601, 603, 632

[56] References Cited

U.S. PATENT DOCUMENTS

| Re. 30,016 | 5/1979 | Hohn | 364/474 |
|---|---|---|---|
| 4,013,875 | 3/1977 | McGlynn | 364/424 |
| 4,038,890 | 8/1977 | Winget | 364/474 |
| 4,181,848 | 1/1980 | Iwase | 364/562 |

Primary Examiner—Errol A. Krass
Attorney, Agent, or Firm—Richard G. Stephens

[57] ABSTRACT

A shelf height selector system for a lift truck provides signals to an operator as he raises or lowers a load carriage relative to a storage shelf level selected by a keyboard in order to perform a store or retrieve operation, and automatically stops carriage movement with load forks at the proper elevation. Pulses from an incremental shaft encoder operated by carriage movement are counted to provide an instantaneous elevation signal upon which indications to the operator and control functions depend. A switch on the truck mast is operated by carriage movement to repeatedly recalibrate a register containing the instantaneous elevation signal, obviating any errors should noise affect tallying of encoder counts. An optical sensor carried on the load carriage to sense reflective markers adjacent some shelves also recalibrates the register, obviating positioning errors due to mast deflection and tire wear. Provision of a simple programming arrangement allows storage of shelf heights in a non-volatile random-access memory, affording the advantages of a field-programmable system.

21 Claims, 6 Drawing Figures

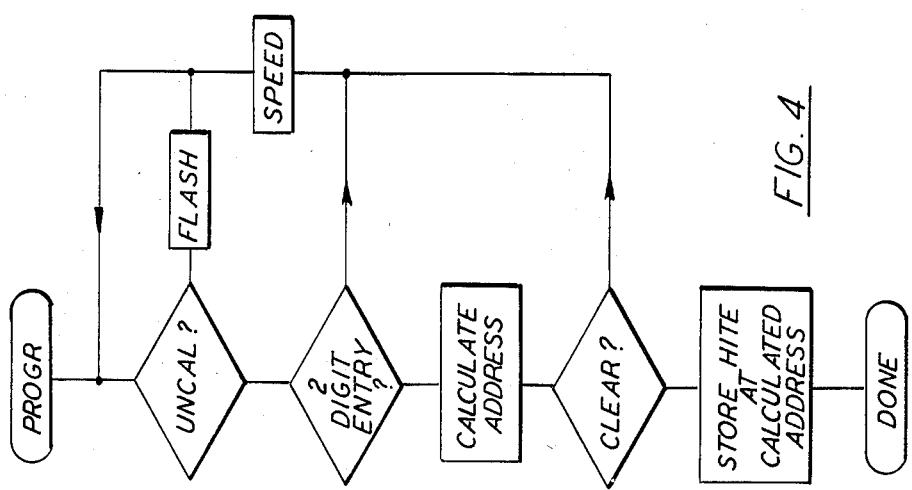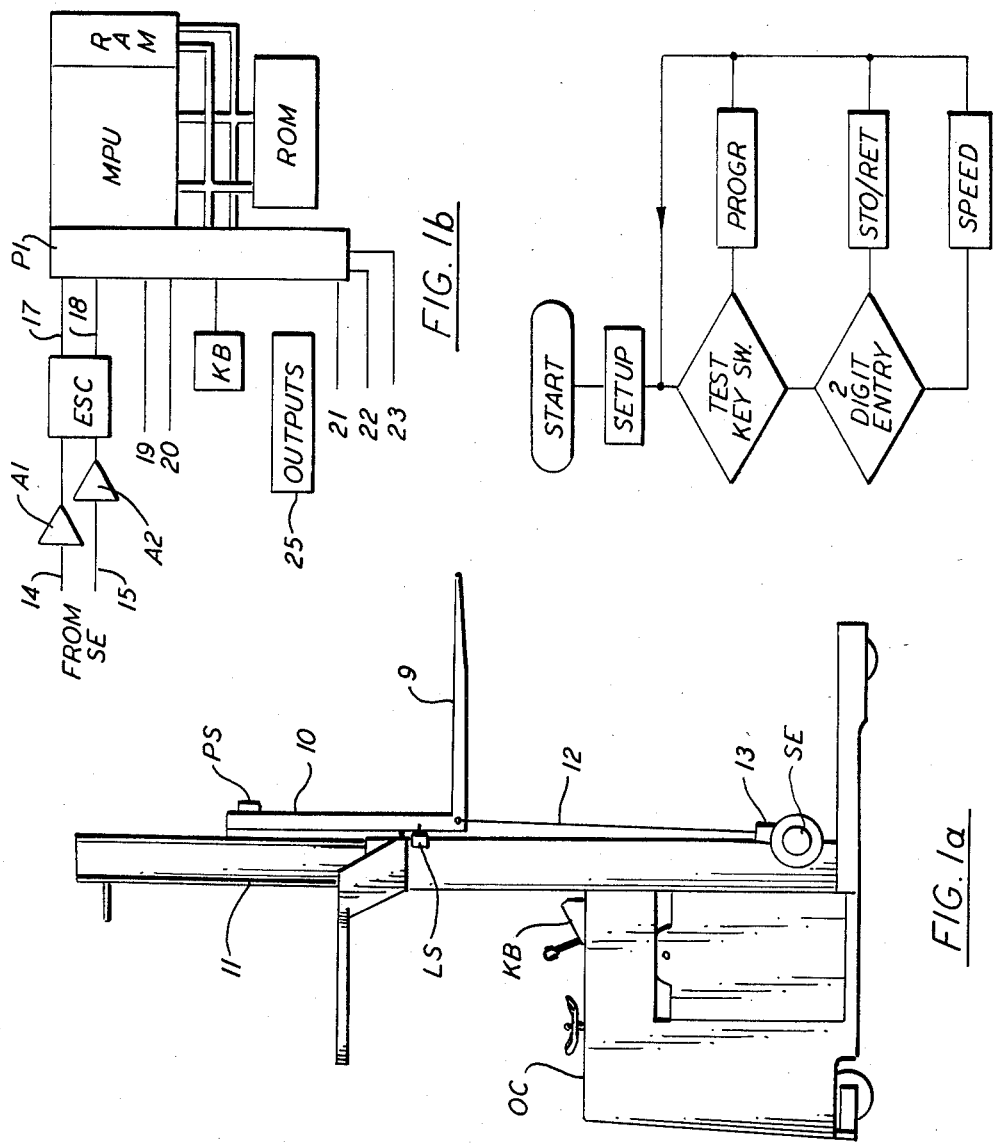

SHELF HEIGHT SELECTOR

This is a continuation of application Ser. No. 20,996, filed Mar. 16, 1979, now abandoned.

This invention relates to improved control apparatus for controlling hoists on rider-operated lift trucks and like devices. Material handling operations commonly involve deposit and retrieval of loads at or from warehouse racks having vertically stacked shelves, requiring that an operator control a truck hoisting mechanism to lift or lower different loads to specified heights. An attempt to deposit a load which has not been elevated to a proper height can damage the load, or sometimes the rack, and sometimes seriously endanger the operator. Many modern lift trucks are capable of lifting loads far above elevations where load forks or the like are clearly visible to an operator stationed at the base of a truck, so that deposit and retrieval of loads has been undesirably slowed down and sometimes made unsafe. Increased handling may be accomplished with greater safety, if improved means are provided to enable an operator to lift or lower loads to designated heights, and provision of such means is a general object of the invention.

Some prior art which might be considered relevant to the present invention is illustrated in the following U.S. Pat. Nos.: 3,049,247, 3,486,640, 3,818,302, 4,122,957, 3,119,501, 3,632,001, 3,873,902.

The recent availability of inexpensive microprocessors and memories has made it economically feasible to control lift truck load carriage positioning and to provide various indications to an operator using such apparatus. One system which has been proposed contemplates that a large number (e.g. 99) of different shelf heights be stored in a read-only memory (ROM), to be selected by an operator by means of a keyboard. After the operator keys in a desired shelf number, the microprocessor system provides indications telling the operator whether to lift or lower the load carriage, and it decelerates and stops the carriage as it approaches the height of the selected shelf, repeatedly comparing a number read from the ROM representing the selected shelf height with a changing number representing instantaneous carriage height. It is convenient to derive the number representing instantaneous load fork height by means of an incremental shaft encoder rotated by a retractable reel having a cable connected to the lift carriage. The shaft encoder supplies pulses which are counted to provide the number representing instantaneous fork height, incrementing or decrementing a counter as the carriage and forks move upwardly or downwardly, respectively. While such an arrangement may function quite acceptably under some operating conditions, it is possible, particularly if substantial electrical noise is present, that occasional encoder pulses wil fail to be counted, or that false counts may occur, so that errors can occur in the number representing instantaneous carriage height, and such errors may accumulate with time. Errors might arise not only in connection with transmission of encoder pulses to the microprocessor, but also in the operation of the microprocessor system itself. The probability of such errors is increased because various other devices aboard lift trucks create substantial electrical noise. Various brute-force techniques for avoiding electrical noise problems, such as elaborate shielding and filtering are undesirably expensive. If such an accumulated error increases beyond a certain magnitude, use of such a system may become fraught with danger. An important object of the present invention is to provide an improved shelf height selector system which does not become dangerously inaccurate due to accumulation of missed or false encoder counts. In accordance with one central concept of the present invention, a switch is located on the truck mast to be operated as the load carriage reaches a predetermined elevation. Each time the switch is operated, a predetermined number is substituted into the counter or register which tallies encoder counts in place of the then count in that register. The switch is preferably located on the mast at an elevation (e.g. 6 feet above the floor) through which the load carriage frequently passes during normal storage and retrieval operations. With such an arrangement, the shelf height selector system will be "re-calibrated" many times during a typical working day. Error can accumulate only during the time in between carriage movements past the switch operating elevation, and any accumulated error is removed or corrected for each time the switch is operated, e.g. each time it is moved from an open to a closed condition.

Even though a shaft encoder can resolve load carriage travel into small fractions of an inch, the positioning accuracy of a shelf height selector controlled by such an encoder may become unacceptable at high carriage heights. Such an encoder measures carriage travel relative to the location of the retractable reel, or essentially the floor, and no matter how accurately the encoder counts are tallied, the count number intended to represent instantaneous fork height will not take into account variations in carriage and fork height which result from mast deflection, tire wear, or floor irregularities. It has been known that such errors can be avoided by provision of an optical sensor on a load carriage which senses reflective targets or the like affixed to storage racks adjacent shelf positions, and various prior art systems have entirely dispensed with means which measure relative to the floor in favor of such optical sensing. However, accurately affixing reflective targets adjacent all the shelves in a warehouse tends to be very expensive. In accordance with a further concept of the present invention, such installation costs are materially reduced, and acceptable positioning accuracy still achieved, by controlling carriage positioning basically from optical sensing at high shelf elevations where mast deflection may otherwise cause problems, but controlling positioning from the encoder input at lower elevations, so that reflective targets need not be installed on the shelves at lower elevations. While the invention will be illustrated as incorporating optical sensing of shelf heights, it will become apparent that other known sensing means, such as mechanical feelers could instead be used. Thus a further object of the present invention is to provide a shelf height selector in which carriage and load fork positioning are controlled alternately by means measuring carriage travel along the mast and means on the carriage which sense target means on or adjacent individual shelves. Load forks must be moved up and down through desired setdown and liftoff distances, and provision of plural reflective targets adjacent each shelf to control those distances would be very expensive. In accordance with the invention, the sensing of a reflective target adjacent a selected shelf causes a value to be substituted into the register whose contents represent instantaneous fork height, and then that value is incremented or decremented by shaft encoder inputs as liftoff and setdown movements are made, so that only a single elevation need be optically sensed at any shelf and very simple reflective targets can be used.

If the heights of numerous shelves in a warehouse or the like are accurately measured, data representing those heights can be readily stored in a ROM at the factory of a control equipment manufacturer. However, if any of the measurements are inaccurate, or if any errors are made in translating the measured dimensions into ROM encoding signals, the ROM may be worthless, and its use may result in unsafe operation. Further, such an arrangement disadvantageously tends to require that the control equipment manufacturer keep on file large masses of shelf height data for numerous customers, so that he can rapidly supply a replacement ROM if one should fail. If changes are made in any shelf elevations, or if different types of pallets are chosen for use, a ROM having previously-stored data tends to become useless. Another general object of the invention is to overcome such problems. In accordance with the present invention, these problems are largely overcome by storage of shelf height data in a non-volatile random-access memory, such as a CMOS RAM. Because the batteries used to power electrically operated lift trucks must be periodically removed for charging or maintenance, a small back-up battery is provided to maintain shelf height data in the RAM even when the main batteries are removed from the truck, and while the truck is in operation the back-up battery is charged from the main battery. While it is commonly known in the computer industry that one may use a battery-backed RAM in lieu of a ROM if one wishes to alter stored data, such an arrangement has not been utilized for lift truck shelf height selection, probably, it is believed, because of potential problems in insuring that programming is done properly. Very few operators of warehouses or other places where many lift trucks are used have persons with programming experience available. One object of the present invention is to provide a shelf height selection system having means which allow extremely unskilled truck operators to readily and accurately store, and if desired change, shelf height data. Another object of the invention is to provide improved shelf height selection means which is useful with a variety of lift trucks of different types and sizes.

The present invention obviates any need for manual measurement of numerous shelf heights, and transmission of those measurements to a remote electronics factory, by use of a field-programmable arrangement. By merely resting the truck load forks on a given shelf and entering an arbitrary shelf number on a keyboard, the operator may store the height of the shelf in the RAM, and thereafter call it up whenever he wishes to store or retrieve a load at that shelf. Thus desired shelf heights can be readily stored by a truck operator, with no need for the services of an electronic technician. Also, with such an arrangement errors in manual measurement of shelf heights and errors in translating them into stored data are obviated, and new data can be readily entered if a shelf height is changed.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings in which:

FIG. 1a is a diagrammatic side view of a conventional lift truck showing the location of various devices added thereto in accordance with the present invention.

FIG. 1b is a diagram, largely in block form illustrating portions of one microprocessor shelf height selector system according to the invention wherein shelf heights are stored in a read-only memory.

FIG. 3 is a flow chart illustrating main program loops in an exemplary stored program usable with the system of FIG. 2.

FIGS. 4 and 5 are flow charts illustrating further portions of such an exemplary stored program.

Figure 5:
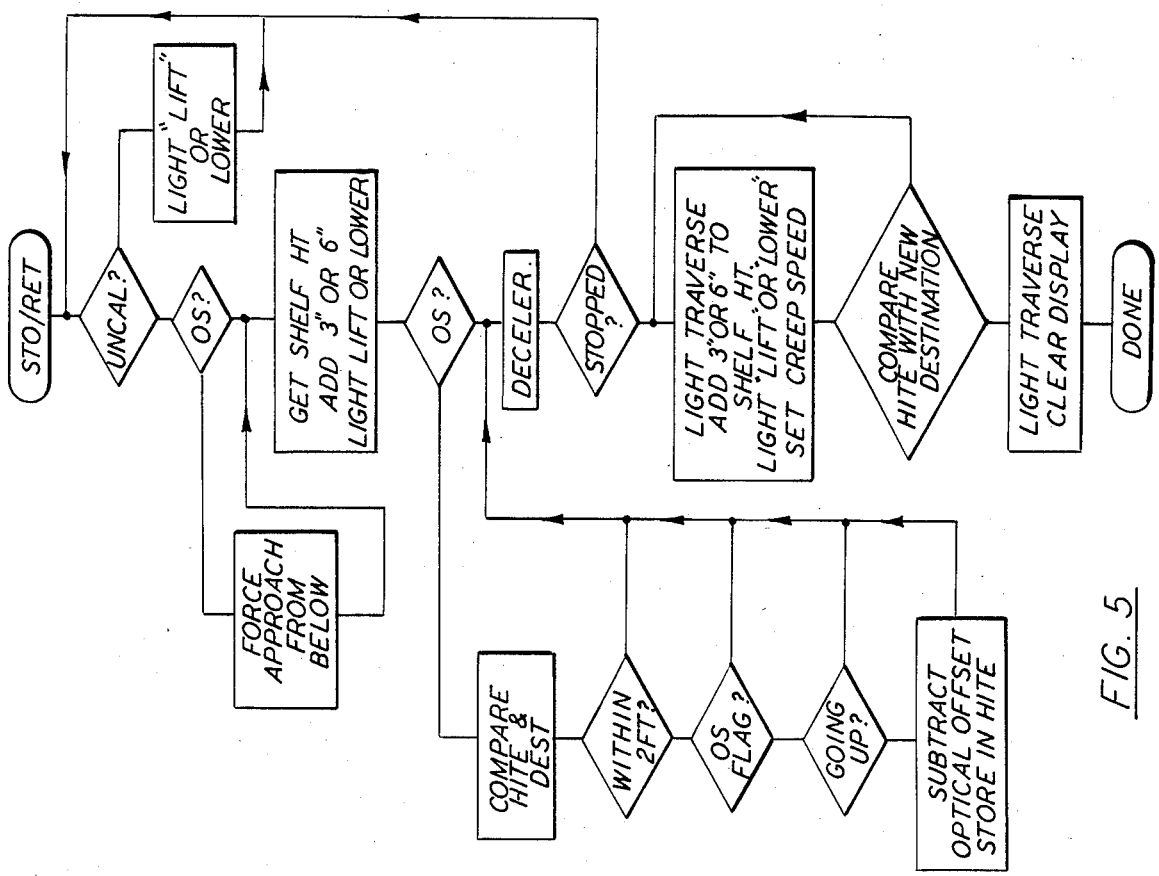

In FIG. 1a a conventional lift truck includes a load carriage 10 which may be raised and lowered along a mast 11 by conventional means not shown, typically one or several hydraulic rams. A plurality of conventional controls are provided adjacent an operator compartment OC, together with added controls and indicators to be described in connection with other figures. Though shown having a single section, mast 11 may and ordinarily will comprise plural extensible sections. Load carriage 10 is shown carrying load forks 9 upon which various loads may be carried, although other forms of load manipulators may be used instead.

As carriage 10 is raised or lowered along a mast 11, cable 12 attached to the carriage is payed out from or reeled into spring-operated retractable reel 13 mounted near the base of the truck, rotating the reel shaft by amounts commensurate with carriage movement. The reel rotates a conventional shaft encoder SE, which may comprise, for example, a Type 702 FS-300-OBLP-TTL sold by Disk Instruments Inc. of Costa Mesa, California. The encoder provides a pair of quadrature-phased output signals on a pair of lines 14, 15 (FIG. 1b). In a typical application each encoder output line will provide several hundred pulses as the encoder is turned one revolution, and the diameter of reel 13 will be chosen so that perhaps 9600 pulses will occur on each of lines 14, 15 as the carriage is raised or lowered over its total range of travel (e.g. 40 feet). Thus a pulse may occur on line 14 (or line 15) for each 0.05 inch of carriage travel.

The pulses from encoder SE are connected, preferably via line driver amplifiers A1, A2 to an encoder state counter ESC, a preferred form of which is shown in my copending application Ser. No. 961,125 filed Nov. 16, 1978, now U.S. Pat. No. 4,266,215. The state counter ESC processes the signals from the encoder and provides count occurrence signals and count direction signals on lines 17 and 18, respectively, to a microprocessor MPU via a conventional interface device PI. The microprocessor and peripheral interface may comprise any of a number of commercially available microprocessor devices, such as a Motorola 6800 microprocessor for the MPU, with several Motorola 6820 peripheral interface adapters comprising interface PI. As the carriage travels in one direction or the other, the state counter applies a brief (e.g. 0.5 microsecond) pulse on line 17 for each 0.05 inch of carriage travel, and the state of line 18 at the time of each such pulse indicates whether carriage travel is then progressing upwardly or downwardly.

The signals on line 17 are applied as interrupt signals to processor MPU. Whenever an interrupt signal is applied to the MPU it interrupts whatever routine it is then executing and performs an interrupt routine stored in its ROM memory. The interrupt routine involves sensing the data of line 18 to determine whether carriage movement at the time is upward or downward, and then incrementing or decrementing the count in a predetermined memory location in a random-access working memory RAM associated with the MPU. The predetermined memory location will be seen to keep track of instantaneous carriage elevation as the carriage is raised and lowered, and for sake of convenience this memory location will referred to as HITE. Most of the indications provided to the operator and most of the control functions performed by the MPU depend crucially upon the number in HITE being an accurate indication of carriage or fork elevation. If noise, jitter or the like causes occasional pulses on line 17 to be missed or spurious noise pulses to be detected, it will be apparent that the number in location HITE could become erroneous, particularly over a substantial period of time. As is shown in my above-mentioned copending application, the encoder state counter disclosed therein operates to reject much noise, and tends to avoid counting errors which reversals in carriage direction otherwise might cause; however, it is believed that under some operating conditions counting errors sometimes may occur.

To preclude unsafe operation if counting or processing errors should occur, the present invention contemplates that switch LS (FIG. 1a) be mounted on mast 11 so as to be closed by upward movement of the carriage past a predetermined elevation, and to be opened upon downward movement below that elevation. Closure of switch LS applies a signal on line 19 (FIG. 1b) to the MPU to set an interrupt flag bit signifying an interrupt request each time switch LS closes, and a data signal so that the MPU can test whether switch LS is open or closed at any given time. In a typical application switch LS will be arranged to close whenever the load forks are 6 or 8 feet above the floor, or higher. The precise height at which switch LS is arranged to operate is by no means crucial, although it must be correlated in a sense with stored shelf heights.

If heights of the shelves to be selected are stored in read-only memory ROM, as is assumed in FIG. 1b, the elevation of switch LS, or more precisely, the elevation of the carriage at which switch LS operates, must correspond in terms of encoder counts to a further stored number which is substituted into memory location HITE each time switch LS closes. For example, if 20 encoder counts are tallied per inch of carriage travel, the heights of two shelves 48 inches and 96 inches above the floor might be stored as "960" and "1920". (Decimal numbers are used herein for convenience of explanation.) The stored shelf heights can include an arbitrary bias or offset, however, so that the stored numbers were instead "1960" and "2920" for example. Assuming the latter arrangement, if switch LS is 60 inches above the floor, the further stored number which is substituted into location HITE each time switch LS closes should be 60×20 plus the same offset (1000), or 2200. The stored number which is substituted into location HITE each time switch LS closes will be termed the quantity REFHT for sake of convenience. The quantity REFHT is preferably stored in memory ROM. Alternatively, the quantity REFHT could be stored in thumbwheel switches or jumper wires (not shown) addressable by the MPU. The latter arrangement tends to be more costly, but has the advantage that factory-programmed ROMs having shelf heights programmed in them may be used with trucks having their respective switches LS at different elevations. Irrespective of whether REFHT is stored in the ROM or in switches, each time the shelf height selectoor system is powered up from a power-off condition, the quantity stored in location HITE may be grossly incorrect, so that performance of a "store" or "retrieve" might cause damage. To prevent such operation, the present invention contemplates that after start-up the program in ROM should prevent the operator from performing various operations and/or should provide warning indications until such time as the operator has lifted the carriage sufficiently to close swith LS to "calibrate" the system. For example, the start-up program in ROM may set a flag, various operations may be prevented or inhibited and/or various indications provided which the flag is set, and the flag then cleared the first time switch LS is operated. The arrangement is described in greater detail below in connection with FIGS. 2-5. It will be apparent that the nature of the indications provided and the manner in which truck operation is inhibited during such a condition will tend to be somewhat a matter of choice in different material handling applications.

In FIG. 1a a light source and photosensor assembly PS carried on the load carriage applies a logic signal on line 20 (FIG. 1b) whenever light is reflected to the assembly from a reflective target mounted on a storage rack. The operator is provided with a switch OS (not shown) which energizes the source and photosensor assembly when in its "on" position and applies a signal to the MPU via line 23 (FIG. 1b). If the truck carriage includes a reach mechanism, one or more switches may be provided to provide signals when the forks are fully retracted, and/or fully extended, lines 21 and 22 being assumed to apply such signals to the microprocessor in FIG. 1b. Further switches (not shown) may provide similar signals on trucks where the forks or other load manipulator may be swung to different positions. A keyboard KB at the operator's station also applies input signals to the microprocessor. A plurality of peripheral devices which receive control or indication outputs from the microprocessor are signified by a block at 25. Keyboard KB and the peripheral devices will be further described in connection with a preferred embodiment of the invention. In FIG. 1b the microprocessor is shown interconnected through address and data buses to a small working random-access memory RAM, to peripheral interface devices PI, and to a read-only memory ROM. Various conventional control lines are not shown.

Figure 2:
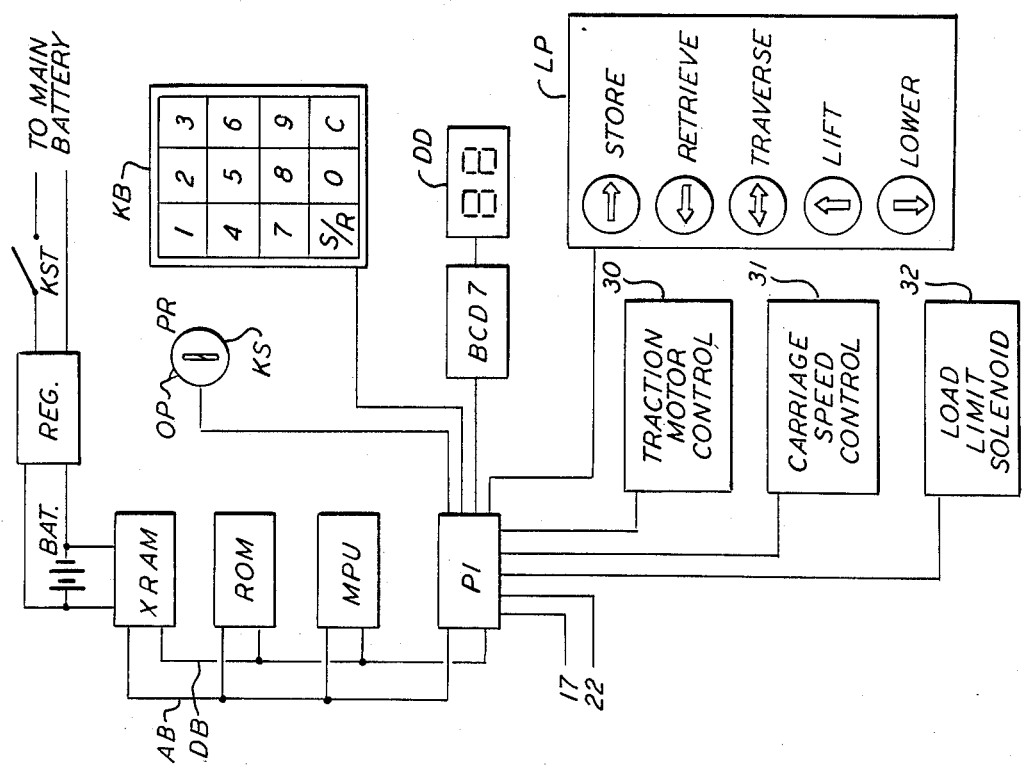
FIG. 2 is a diagram, largely in block form, illustrating a preferred form of shelf height selector system wherein shelf heights are stored in a non-volatile random-access memory.

In a preferred form of the invention shelf heights are stored in a non-volatile random-access memory, such as a battery-backed RAM. Systems which store shelf heights in such a fashion have the advantage of being field programmable. In FIG. 2 microprocessor MPU is shown connected by multi-line address bus AB and multi-line data bus DB to a read-only memory ROM and to random-access memory XRAM. Various conventional control lines from the MPU are again not shown. Memory XRAM is shown connected to be powered by a backup battery BAT, so that data stored in XRAM will be retained even when power to the MPU is turned off. It is to be understood that power to the MPU and various other truck circuits will be turned completely off, at the end of each working day, for example, but that once the system is turned on, memory XRAM will be permanently powered. When power on the truck is turned on, by means of a keyswitch KST, power from the truck main battery is applied through a regulator REG to keep battery BAT charged up to the XRAM operating voltage. The quantity REFHT may be stored in memory ROM, or in switches, as in the case of ROM-stored shelf heights.

The conventional peripheral interface PI associated with the MPU allows the MPU to receive data from various peripheral devices and to send data to various other peripheral devices. The vehicle is provided with an operator-controllable keyswitch KS which has "operate" and "program" positions, either of which can be tested by the MPU. A keyboard KB has 0-9 digit buttons, a "clear" button C and a "store/retrieve" button S/R. Though shown connected via a single line for drafting convenience, keyboard KB provides a four-bit word plus an interrupt strobe to MPU whenever one of its buttons is depressed. Successive depression of digit buttons apply successive BCD signals to a half-byte register in the interface PI. Data put in that register is applied by the MPU to a conventional BCD to 7-segment decoder BCD 7 to operate a two decimal-digit LED display DD visible to the operator. Successive depressions of button S/R toggle the system between "store" and "retrieve" conditions, and the MPU can sense the current one of these two conditions. A plurality of output lines provide signals from the MPU to the vehicle traction motor control circuit 30 to limit vehicle speed, to a group of solenoid-operated hydraulic valves forming a carriage speed control 31 to limit the speed at which the operator can raise or lower the carriage, and to a solenoid operated hydraulic valve 32 which limits the weight of load which can be lifted. Further output lines selectively illuminate various lights shown grouped at LP, to prompt the operator as he stores or retrieves a load. The shaft encoder state counter, photosensor and switch outputs on lines 17–23 are applied to the microprocessor in the same manner as in FIG. 1b.

In the system illustrated, starting, stopping and speed of carriage movement can be controlled at all times by the operator by means of a conventional manual valve control (not shown), except that the computer-controlled carriage speed control 31, which is hydraulically in series with the manual control valve, automatically decelerates and stops the carriage in a manner to be described. The traction motor control circuit may take a variety of forms which will be apparent to those skilled in the art, to limit the maximum speed which the operator can provide through use of his usual speed control (not shown). The carriage speed control 31 may comprise a plurality of solenoid valves which are closed in various combinations to limit the carriage speed, and stop the carriage, and a servo-valve operated via a digital-to-analog converter could be substituted. The load limit valve may connect the conventional hydraulic hoist to a pressure relief valve to limit the maximum load which can be lifted. An understanding of the preferred embodiment of FIGS. 1a and 2 now can be facilitated by consideration of the basic principles of an exemplary program which is stored in the ROM.

Referring to FIG. 3, as power is turned on at the MPU, it first performs a setup routine stored in ROM to initialize numerous registers in conventional fashion, and also set a flag bit which will be termed UNCAL. The program then repeatedly loops through various of the program loops shown in FIG. 3. After the setup routine the MPU tests keyswitch KS. If the operator has that switch in its "program" position a programming routine described below is executed. If the switch KS is in its "operate" position, a test is made to determine whether the operator has entered two digits on keyboard KB (and thereby set a two-bit flag) and if he has, a "store or retrieve" sub-routine briefly described below is executed. If he has not entered two digits, a "speed" sub-routine is executed, transmitting signals to the traction motor control to limit vehicle speed under various desired conditions, and operating the load limit valve under desired conditions. Though labelled "speed", this sub-routine is intended to signify as well a number of further tests which are made in the interests of safety. This sub-routine also may be performed as part of the initial setup, the programming routine and the store/retrieve routine. After execution of one or another of these routines the program loops back and is repeated. As the program cycles through the various loops shown in FIG. 3, it may be interrupted on numerous occasions, of course, by interrupt signals from encoder state counter ESC as the carriage moves, or by interrupt signals from keyboard KB. If the flag UNCAL is set, which will be the case after start-up until the carriage has been raised to close switch LS, performance of the speed routine limits vehicle speed, and the setting of that flag also prevents any programming of shelf height data and prevents the "store or retrieve" routine from being executed, as will be seen presently.

The simple manner in which shelf heights can be stored in the non-volatile XRAM can be understood by reference to FIG. 4. To store a given shelf height in memory XRAM, the operator need merely touch the forks on the shelf, put keyswitch KS in the "program" position, enter the two-digit number he wishes to use to identify that shelf height on keyboard KB, and push the "clear" button C. It is vital, however, that a correct height value be present in location HITE when any such programming occurs. When the MPU has just been turned on, the value in HITE may be grossly incorrect; thus it is necessary that he raise the carriage to close switch LS at least once after start-up to guarantee that an accurate value is stored in HITE. If he has not previously raised the forks to operate switch LS, the flag UNCAL will be set, causing a simple "flash" routine to repeatedly flash the display lights, and preventing programming of a shelf height from progressing further. It will be apparent that different forms of warning indications could be substituted for a flashing of display lights, such as merely lighting an "uncalibrated" light (not shown), for example. Assuming he has "calibrated" the system, the two-digit number he has entered on the keyboard is used to calculate an address in XRAM where the then contents of HITE will be stored. Calculating such an address may be very simple. For example, the address for shelves Nos. 23 and 24 might be (in decimal numbers) 1023 and 1024, or just as well 2023 and 2024. Using a byte-oriented MPU, and assuming a shelf height is specified by two bytes (16 bits), one may double the keyed-in number and add it to a base number, so that starting addresses for shelves Nos. 23 and 24 could be 1046 and 1048, for example. The keyboard entry, in "BCD code" will be converted to binary, of course, by use of a standard conversion routine, since addresses are specified by binary numbers. After the calculation of such an address, the program then loops until the operator presses the clear button C to set a flag, whereupon the contents of location HITE are stored in memory XRAM at the just computed address. The contents of HITE are, of course, the level of the shelf on which the folks are then resting. Many further shelf heights (e.g. 98 more) can be stored in similar fashion.

During normal operation when the operator has made a two-digit keyboard entry, a store or retrieve sub-routine of the general form shown in FIG. 5 may be executed. Operation without optical sensing will be explained first. If the operator has not raised the carriage to clear the UNCAL flag since power to the MPU was turned on, the condition of switch LS is tested. If the carriage is below the position at which switch LS closes, the "lift" light is illuminated to instruct him to lift, while if switch LS is closed, he is prompted to lower the carriage and then lift it. Once switch LS has been closed to calibrate the system, execution of the store/retrieve routine results in his keyboard entry being read, the address where the shelf height it pertains to is computed in the same manner as done during programming, and the shelf height value is obtained from that address. Then one of two numbers stored in the ROM is added to the height value which was addressed by his keyboard entry, which depending upon whether he has selected a "store" or a "retrieve" operation. For example, a count representing 3 inches (in terms of encoder counts, e.g. 60) may be added if he is retrieving a load and wishes the forks to enter a pallet with a 3-inch clearance above the shelf, while a count representing 6 inches may be added if he intends to move a load on the forks into the rack prior to lowering a pallet onto a shelf. A simple sub-routine then compares the current carriage elevation (in HITE) with the sum, which may be called the destination height, and appropriately illuminates the "lift" or "lower" light to prompt him to move the carriage up or down. As the current height approaches the desired destination height, a straightforward deceleration routine slows carriage movement and eventually stops the carriage at the desired destination height.

The operator then may extend the forks into the rack or shelf space, with a 3-inch or 6-inch clearance dependent upon whether he is storing or retrieving, as previously mentioned. Then, depending upon whether he is storing or retrieving the 6-inch value or the 3-inch value is added to the shelf height which had been addressed by his keyboard entry, to compute a new destination height. If he is storing so that the forks entered the racks with a 6-inch clearance, the 3-inch value is added to provide a new destination having a 3-inch clearance above the shelf, at which destination the pallet will rest on the shelf, and the folks will be above the shelf so as not to scrape on the shelf as he retracts the forks; while if he is retrieving, the 6-inch value is added to provide a new destination having a 6-inch clearance above the shelf, so that he will lift the pallet and load off the shelf before retracting with the load on the forks. A simple sub-routine then compares instantaneous height with the new destination height and appropriately lights the "lift" or "lower" light, carriage speed is forced to a slow, creep speed, stopped at when the carriage is at the new destination height, and then a "traverse" light is lit to cue the operator to retract the forks.

For sake of simplicity and ease of understanding various exits which occur from various routines if the operator pushes "clear" or moves the keyswitch have not been shown.

If the operator has closed his switch OS (not shown) to activate the light source and photosensor assembly PS, testing of switch OS causes execution of a routine which cues the operator to always approach the reflective target for the selected shelf from below. The photosensor signal on line 20 then will always occur as the upper edge of the reflected optical beam strikes the photosensor, obviating any error due to vertical spread of the beam. The instantaneous height value in HITE, and a fixed value stored in the ROM and representing a distance of 2 feet, for example, are both subtracted from the shelf height selected by the keyboard entry. If the difference is a negative value, indicating that the forks are higher than two feet below the selected shelf level, the "lower" light is illuminated and the mentioned routine repeated until the operator appropriately lowers the carriage. If the difference is a positive value, the "lower" light is not lit. The mentioned routine also preferably sets the carriage speed control solenoids to initially allow full speed of the carriage.

Next during execution of the store/retrieve routine if switch OS is closed, the fork height value (in HITE) is compared with the computed destination elevation. So long as the forks are more than 2 feet below the destination, the deceleration and stop routine shown in FIG. 5 is executed and the program loops. The deceleration routine clears the photosensor flag each time the routine is performed, so that reflective markers for shelves below the desired shelf are ignored. When the forks are within two feet of the destination, the flag which photosensor output line 20 can set is tested. When the photosensor sets the flag, line 18 is tested to insure that the carriage is going up at that time. Then an optical offset distance stored in the ROM is subtracted from the shelf height selected by the keyboard, and the difference is stored in location HITE. The optical offset distance is the vertical distance which the forks lie below any shelf when the upper edge of the photosensor beam reflects from the reflective target associated with that shelf to raise line 20. In any given application that distance will depend upon both how far above the forks the sensor assembly is mounted on the carriage, and upon the vertical positions of the reflective markers with respect to their respective shelves, the latter relative positions all being the same, of course, for those shelves provided with such markers. Thus subtracting the optical offset distance from the shelf height as a photosensor logic signal occurs and storing the difference in location HITE updates or corrects the value in HITE, recalibrating the system and eliminating any error which occurs due to mast deflection and/or tire wear, and variations in height of various shelves. With the value in location HITE updated, the store-retrieve routine then proceeds as previously described. As the carriage is moved up or down short setdown or liftoff distances to complete a store or retrieve operation, the value in location HITE is incremented or decremented by reason of shaft encoder pulses, of course.

While FIG. 1 shows a single switch LS carried on the truck mast, it is within the scope of the invention to provide one or more further similar switches which are operated at other carriage elevations to provide interrupt signals which causes other reference quantities stored in ROM to be transferred to HITE during operation of the truck.

It is to be understood that the mast-carried switch LS may be used for repeated system calibration on a truck which uses the computer system of FIG. 1b or that of FIGS. 2-5 irrespective of whether an optical sensor is used, and that the optical sensor updating may be used irrespective of whether switch LS is used.

It is possible and within the scope of the invention, to connect switch LS so that it provides an interrupt to correct HITE each time the switch closes or opens, resulting in more frequent recalibration, but it is preferred that switch LS provide an interrupt only during carriage travel in one direction (preferably the upward direction) thereby avoiding any "backlash" in switch operation, i.e. problems associated with the switch operating at different carriage positions for the two travel directions.

It is not strictly necessary that the quantity REFHT, nor the liftoff, setdown, or optical offset distance values per se be stored in the ROM (or by thumbwheel switches or jumper wires or the like), and these values could instead be computed by brief routines. For example, the quantity REFHT might be computed by clearing and complementing an accumulator and then performing one or more right shifts. However computing such constants have no apparent advantage over merely storing the values in the ROM, and has the apparent disadvantage of requiring more ROM storage.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a lift truck having means for vertically moving a load carriage up and down a mast, the combination of a rotary shaft encoder means connected to be operated by vertical movement of said load carriage and operable to provide signals representing incremental vertical movement of said carriage; a processor having an arithmetic unit, a read-only memory containing program instructions and data, random-access memory means including a non-volatile random-access memory unit, and means for transmitting and receiving data, said processor being connected to receive said signals representing incremental vertical movement of said carriage and operable by a portion of said instructions to increment and decrement a first register means in said memory means to provide data representing the current elevation of said carriage; a manually-operable keyboard means carried on said truck for selecting shelves at which loads are to be stored or retrieved, a first group of said instructions being operable in response to an entry on said manually-operable keyboard means to read elevation data from an address in said non-volatile memory unit computed from said entry and to control said means for moving said load carriage in accordance with a function of the difference between said elevation data and the contents of said first register means; a manually-controlled switch operable to provide a programming mode of operation, a second group of said instructions being operable in response to an entry on said manually-operable keyboard during said programming mode of operation to transfer the data from said first register means to an address in said memory unit computed from said entry during said programming mode of operation.

2. The truck according to claim 1 having an operator-controlled switch for selecting a store or a retrieve mode of operation, said first group of said instructions being operable in controlling said means for moving said load carriage to add a first predetermined value to said elevation data during a store mode of operation and to add a second predetermined value to said elevation data during a retrieve mode of operation.

3. The truck according to claim 1 wherein said encoder means includes means for producing pulse signals during increments of vertical movement of said load carriage and means for producing a logic signal having a state which indicates the direction of said vertical movement at the time of occurrence of each of said pulse signals, said pulse signals being connected to interrupt said processor, said instructions including an interrupt routine operable upon occurrence of any of said pulse signals to increment or decrement said first register means depending upon the state of said logic signal.

4. The lift truck according to claim 1 which includes first switch means positioned on said mast to be operated when said load carriage reaches a predetermined vertical position on said mast, a third group of said instructions being operable upon each operation of said first switch means to store a predetermined value in said first register means.

5. The truck according to claim 2 wherein said first and second predetermined values are stored in said read-only memory.

6. The truck according to claim 2 wherein said truck has a plurality of selectively-energized conductors forming third and forth registers to store said first and second predetermined values.

7. The truck according to claim 2 wherein said program instructions include a third group of instructions for computing said first and second predetermined values.

8. The truck according to claim 4 wherein said predetermined value is stored in said read-only memory.

9. The truck according to claim 4 having a plurality of selectively-energized conductors forming a register storing said predetermined value.

10. The truck according to claim 4 wherein said program instructions include a fourth group of instructions for computing said predetermined value.

11. The truck according to claim 4 wherein said program instructions include a start-up routine operable to set a flag upon start-up of said processor, operation of said first switch means being operable to clear said flag.

12. The lift truck according to claim 11 wherein said read-only memory includes an instruction which prevents completion of said second group of instructions if said flag is set.

13. A material handling vehicle having hoist means for vertically moving a load carriage up and down a mast, rotary shaft encoder means mechanically connected to be operated by vertical movement of said carriage and operable to provide successive electrical signals representing incremental movement of said carriage; counting means for tallying said electrical signals to provide a first data signal in a first register representing the current elevation of a portion of said carriage; an operator-controllable keyboard digit entry means aboard said vehicle for providing a second data signal representing a desired shelf; processor means responsive to said first and second data signals for either controlling said hoist means or for storing said first data signal at a memory location of said processor means dependent upon said second data signal; and manually-controllable switch means aboard said vehicle for selecting the response of said processor to said first and second data signals.

14. The vehicle according to claim 13 having sensor means vertically movable with said load carriage for sensing objects carried on storage racks at predetermined elevations to provide sensor signals; and means responsive to one of said sensor signals for storing a value commensurate with said second data signal in said first register.

15. The vehicle according to claim 13 having a photosensor movable vertically with said carriage and operable to provide flag signals upon sensing objects carried on storage racks adjacent to which said vehicle may be positioned, and means for updating said first data signal to a value computed from said second data signal upon the occurrence of one of said flag signals.

16. The vehicle according to claim 14 wherein said sensor means comprises an optical sensor and said objects carried on storage racks comprise reflective targets.

17. A vehicle according to claim 15 wherein the last-recited means is operable to combine said second data signal with a predetermined value to provide the updated value of said first data signal.

18. A vehicle according to claim 15 wherein the last-recited means is operable to ignore said flag signals unless the difference between said second and first data signals is less than a predetermined value.

19. A vehicle according to claim 15 having means for preventing said updating of said first data signal unless said carriage is moving in a predetermined direction at the time of occurrence of said one of said flag signals.

20. A controller for an auxiliary mechanism of an industrial truck, comprising: sensing means coupled to detect movement of said mechanism and provide signals denoting increments of that movement; means for receiving and accumulating said signals to provide a count in a first register denoting the position of the mechanism along its range of movement; a memory which is addressable to provide a designated one of a plurality of stored representations for comparison with said count in said first register; means cooperating with said memory for designating one of said stored representations; means for comparing the count with said designated representation made available from the memory to provide a signal for controlling the movement of the mechanism; means for effecting storage in the memory of signals denoting different positions along the range of movement; and means for transferring a count in said first register to the memory for storage as one of said plurality of representations.

21. A controller for an auxiliary mechanism of an industrial truck, comprising: a sensor which is coupled to detect movement of the said mechanism and provides signals denoting increments of that movement; a counter which receives said signals and thereby provides a count denoting the position of the mechanism along its range of movement; a memory which is controllable to provide one of a plurality of stored representations for comparison with said count; means for comparing the count with a representation made available from the memory to provide a signal for controlling the movement of the mechanism; means for effecting storage in the memory of signals denoting different positions along the range of movement; a keyboard means, operable by a human operator, for effecting storage of said count by said memory in a storage location of which the address is determined by the operation of a particular selection from said keys; and means responsive to operation of the keyboard to address the memory to make the stored count available for comparison.

* * * * *